United States Patent [19]

Chu et al.

[11] Patent Number: 4,742,224

[45] Date of Patent: May 3, 1988

[54] CHARGED PARTICLE ENERGY FILTER

[75] Inventors: Steven Chu; Aly Dayem, both of Colts Neck; Eric H. Westerwick, Aberdeen, all of N.J.

[73] Assignee: American Telephone and Telegraph Company AT&T Bell Laboratories, Murray Hill, N.J.

[21] Appl. No.: 944,451

[22] Filed: Dec. 22, 1986

[51] Int. Cl.[4] .......................... B01D 59/44; H01J 39/34

[52] U.S. Cl. .................................. 250/305; 250/396 R; 250/281

[58] Field of Search ........... 250/281, 282, 305, 396 R, 250/294; 313/359.1, 360.1, 361.1

[56] References Cited

U.S. PATENT DOCUMENTS

| | | | |
|---|---|---|---|
| 2,640,948 | 6/1953 | Burrill | 250/396 |
| 3,582,649 | 6/1971 | Taylor | 250/305 |
| 4,126,781 | 11/1978 | Siegel | 250/281 |
| 4,224,518 | 9/1980 | Taylor | 250/305 |

FOREIGN PATENT DOCUMENTS

| | | | |
|---|---|---|---|
| 0208894 | 1/1987 | European Pat. Off. | 250/281 |
| 0194446 | 11/1982 | Japan | 250/305 |
| 0123154 | 7/1984 | Japan | 250/281 |

OTHER PUBLICATIONS

Rev. Sci. Instrum, 52(11), Nov. 1981, "New wide angle, high transmision energy analyzer for secondary ion mass spectrometry" M. W. Siegel et al., pp. 1603–1615.

*Primary Examiner*—Bruce C. Anderson
*Assistant Examiner*—Paul A. Guss
*Attorney, Agent, or Firm*—Daniel D. Dubosky; Eli Weiss

[57] ABSTRACT

An ion energy filter of the type useful in connection with secondary ion mass spectrometry is disclosed. The filter is composed of a stack of 20 thin metal plates, each plate being insulated from the others and having a centrally located hole with a unique radius. A metallic hemisphere is mounted on a base plate, and the 20 thin metal plates are attached to the base plate such that the plate with the smallest central hole is adjacent to the base plate and the radii of the holes in subsequent plates increase with increasing distance from the base plate. The relative potential of each plate is determined by a series string of 20 resistors with each plate being connected to a different junction in the series string. The radii of the centrally located holes are selected such that the voltage on each plate is inversely proportional to the radius of its centrally located hole.

4 Claims, 4 Drawing Sheets

CHARGED PARTICLE ENERGY FILTER

This invention relates to charged particle energy filters, and more particularly to devices capable of selecting only charged particles having energies within a relatively narrow range of energy.

BACKGROUND OF THE INVENTION

Secondary Ion Mass Spectroscopy (SIMS) is a surface analysis technique that characterizes materials by determining the mass of the secondary ions that are made to leave the material. To achieve maximum mass resolution, only those secondary ions having energies within a relatively narrow range must be allowed to enter the mass analyzer. See the article entitled "New wide angle, high transmission energy analyzer for secondary ion mass spectrometry", by M. W. Siegel and M. J. Vasile, *Rev. Sci. Instrum.*, 52(11), November 1981, pp. 1603–1615.

Several ion energy filters have been designed to accomplish this. In all of the designs, the ions are subjected to electrostatic or magnetostatic fields, combined with trajectory selecting apertures. Filter designs that produce an electrostatic field between two concentric hemispheres are popular. Unfortunately, as the distance between the hemisphere is increased to permit larger elliptical orbits, the performance is compromised by increasingly large fringe fields between the edges of the two hemispheres.

One ion energy filter in the prior art establishes a force field E with spherical symmetry where $E\alpha(1/r^2)$, like that which would be produced between two concentric spheres by using one hemisphere on an infinite plane with a potential distribution on the plane that follows the relationship $V\alpha(1/r)$ where r is the radial distance from the center of the plane. See U.S. Pat. No. 4,126,781 issued Nov. 21, 1978 to M. W. Siegel. Because of the boundary condition established on the plane, a second larger hemisphere is not required, and fringe fields are eliminated.

In the Siegel patent as in the above-identified Siegel et al article, a shaped resistive disk is used to establish the potential distribution proportional to 1/r. This resistive disk is made of a ceramic material impregnated with metal particles. Unfortunately, this impregnated ceramic material is porous and hence incompatible with ultrahigh vacuum applications. It has a poor electrical performance attributable to its nonuniform resistivity and the random localized charging of its surface.

SUMMARY OF THE INVENTION

The present invention is based on the idea that the potential distribution can be segmented into a number of equipotential concentric rings, and those rings need not be coplanar, provided the potentials applied to them obey the relationship $V\alpha(1/r)$. The problem of providing an ion energy filter with an improved electrical performance in a SIMS chamber is solved in accordance with the present invention wherein a plurality of circular conductive plates, each one of which has a centrally positioned hole of a different size from all of the other plates, are assembled to each other and to a base plate so as to form a stack wherein each plate is electrically insulated from all of the other plates. The base plate has a conductive hemispherical structure mounted at its center and all of the plates, where needed, have two holes diametrically positioned a predetermined distance from the center through which the ions can pass. Each plate also has a tab which is connected to a different junction in a series of resistors. By choosing the radii of the central holes in the plates and the values of the resistors, application of a single potential to the entire series of resistors will establish a potential distribution that is proportional to the reciprocal of the radius.

BRIEF DESCRIPTION OF THE DRAWING

The invention will be more readily understood after reading the following detailed description in conjunction with the drawings wherein.

DETAILED DESCRIPTION

Figure 5:
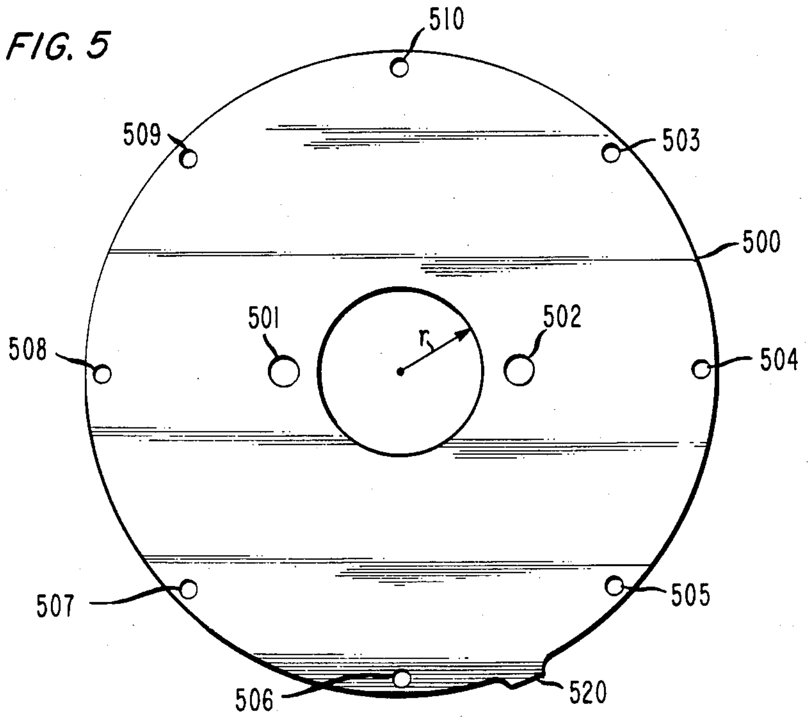
FIG. 5 is a top view of a representative one of the plates used in the ion energy filter.

An ion energy filter can be constructed in accordance with the present invention by fabricating 19 thin stainless steel plates of the type shown in FIG. 5. Each plate has a central hole with a unique inside radius. Each plate 500 has a tab 520 located at a unique place on the circumference of the plate. As the central hole size is increased, the position of the tab is moved counterclockwise when the plates are viewed from the top.

Figure 2:
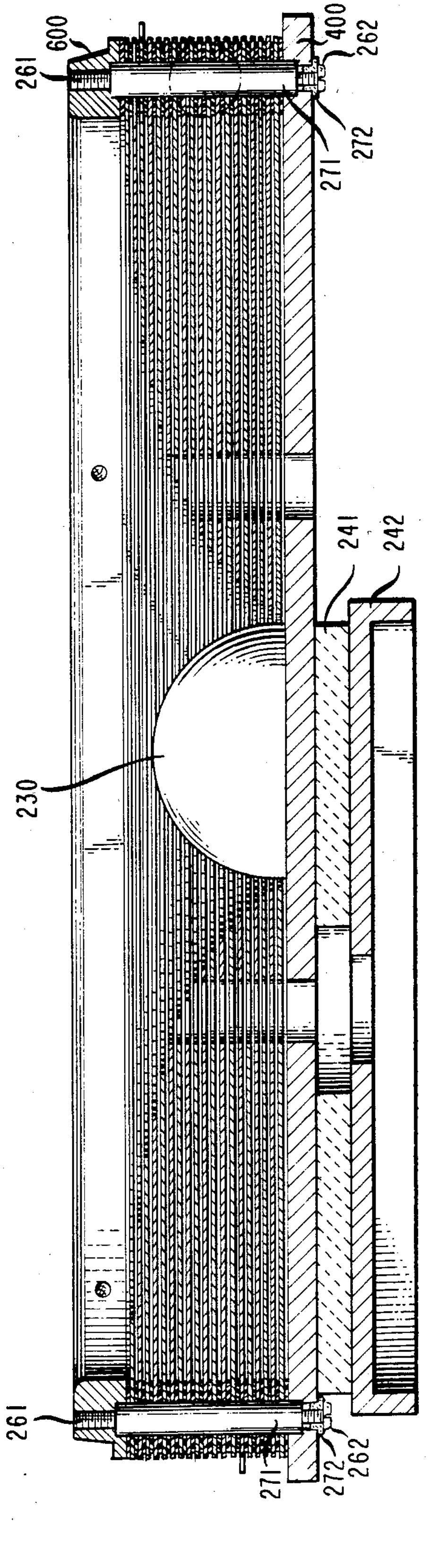
FIG. 2 is a cross-sectional view of the ion energy filter shown in FIG. 1.
Figure 4:
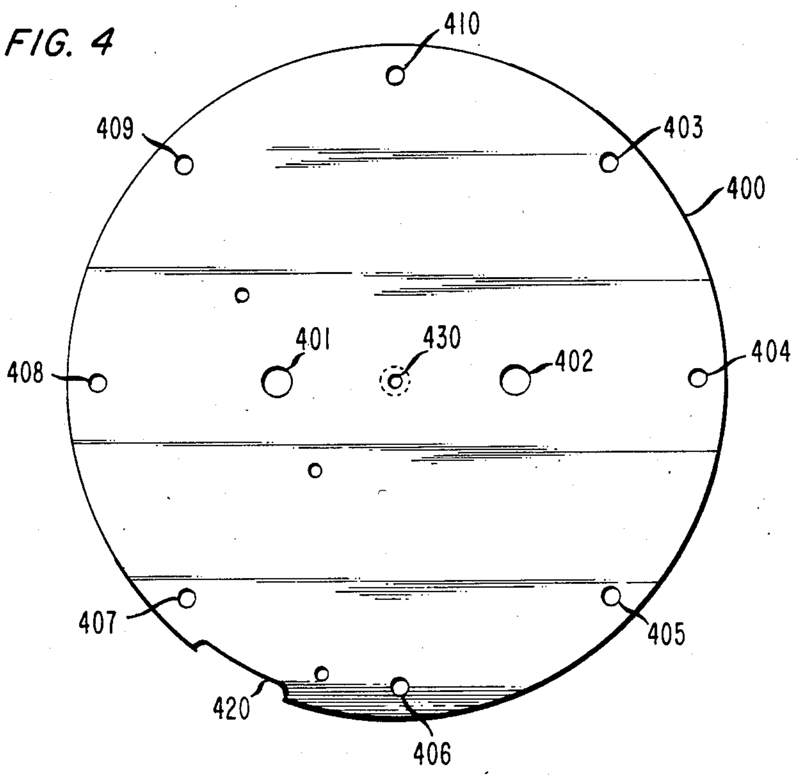
FIG. 4 is a top view of the base plate used in the ion energy filter.

An ion energy filter employing this set of plates can be constructed by fabricating a stainless steel base plate 400 of the type shown in FIG. 4. A metallic hemisphere 230 is bolted to the center hole 430 of the base plate as shown in FIG. 2. A ceramic tube 271 is placed in each of the counterbored holes 403 through 410. A flat Teflon washer 311 is placed around each of the eight ceramic tubes and adjacent to the base plate 400. A plate 500 of the type shown in FIG. 5 having the smallest central hole is positioned above the eight ceramic tubes. The plate is oriented so that the holes 501 and 502 align with the base plate holes 401 and 402, and the tab 520 is adjacent to the base plate opening 420. The plate is then further positioned to align the eight holes 503 through 510 with the eight ceramic tubes. The plate is made to slide down the ceramic tubes until it contacts the eight Teflon washers. The installation of alternating layers of Teflon washers and plates is continued until all 19 flat plates are installed. The plates are installed in the order of increasing central hole size.

Figure 6:
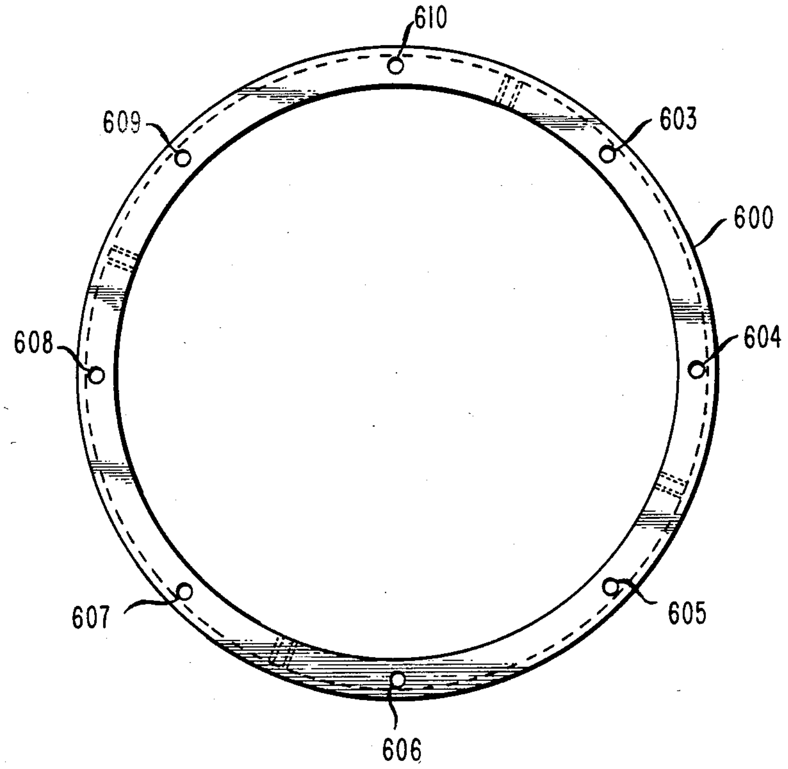
FIG. 6 is a top view of the top ring of the ion energy filter.

A final set of Teflon washers is installed followed by the top ring 600 of the type shown in FIG. 6, which has counterbored holes 603 through 610 which accept the ceramic tubes as shown in FIG. 2 for two of the tubes.

A ceramic shoulder washer 272 is placed around each of eight 0-80 machine screws 261. The machine screws 261 are inserted into the base plate holes 403 through 410 from the underside of the base plate. The screws are guided by the ceramic tubes to the threaded holes 603 through 610 in the Top ring 600. The screws are threaded into these holes and tightened until the Teflon washers are compressed to their nominal thickness. The assembled stack can be represented by the cross-sectional drawing in FIG. 2.

Figure 1:
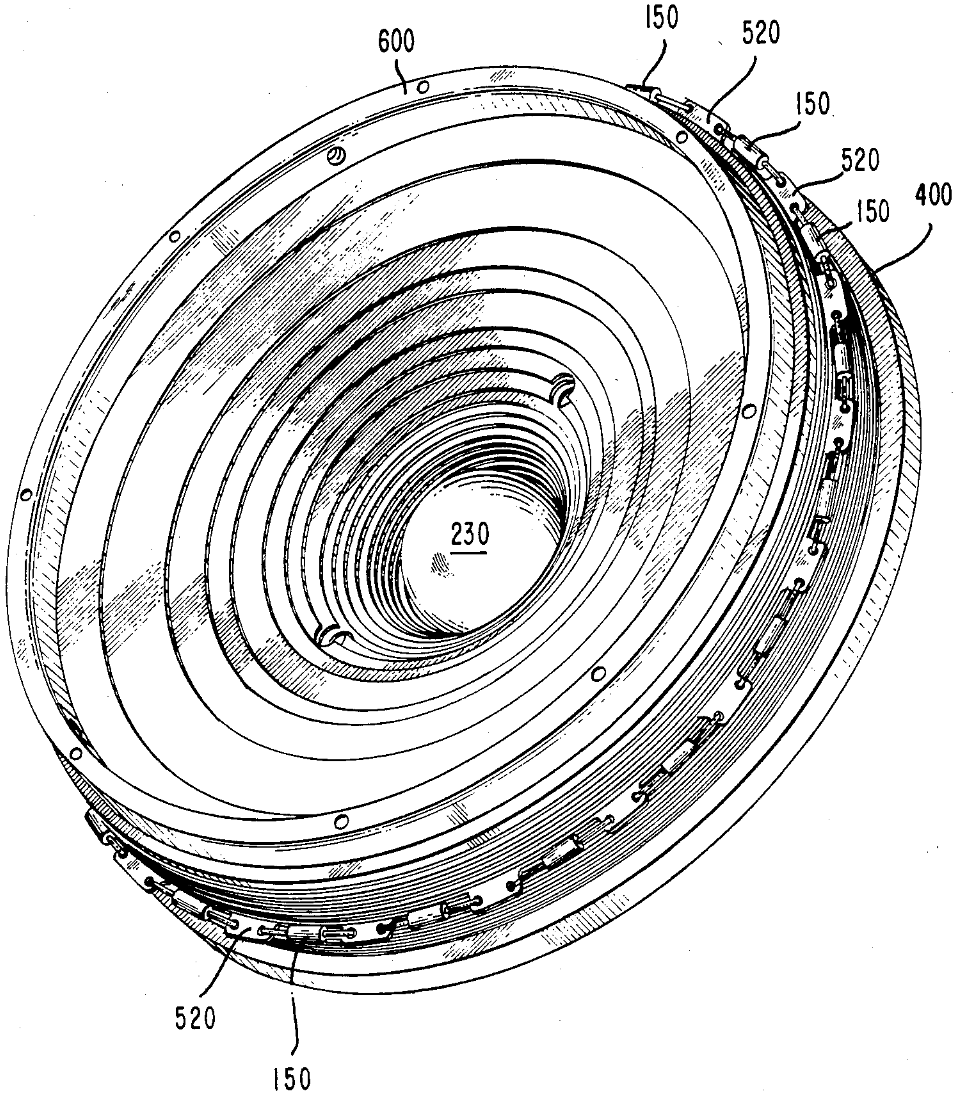
FIG. 1 is a pictorial drawing of an ion energy filter constructed in accordance with the present invention.
Figure 3:
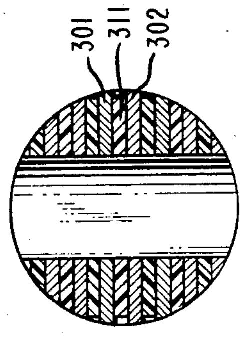
FIG. 3 is a balloon diagram of the ion energy filter in the region of one of the assembly bolts.

When assembled in the above manner and viewed from the top, the tabs 520 on the plates 500 form a counterclockwise spiral of evenly spaced tabs as shown in FIG. 1. A resistor is welded between each of the adjacent tabs. Resistors are also connected between the lowest flat plate 500 and the base plate, and between the highest flat plate 500 and top ring 600. All resistors have the same value of resistance. A wire is connected to base plate 400, and another wire is connected to top ring 600. When these wires are connected to a voltage source, the resulting current flowing through the chain of equivalent resistors produces potential steps of equal value of the set of plates.

In order to support the filter on the end of a quadrupole mass filter, an insulating disc 241 is secured to the underside of the base plate 400. A metallic cap 242 is in turn secured to the insulating disc (refer to FIG. 2). The disc and cap each have a hole on center of a diameter significantly larger than that of hole 401 in the base plate 400. The insulating disc 241 and metallic cap 242 are centered at the axis of the hole 401, and are of such diameters as to not interfere with the hole 402, the entrance aperture of the ion energy filter.

If the energy filter is to be used in an environment having strong ambient electromagnetic fields, these fields may interfere with the fields produced by the filter. To prevent this, a large metallic outer hemisphere centered with the small metallic hemisphere 230 can be secured to the beveled rim of the top ring 600. A small hole must be placed in the outer hemisphere to allow the entrance of the primary ion beam. The center of this hole must be on the axis of the energy filter entrance aperture defined by holes 402 and 502.

Each resistor 150 is fabricated by winding a resistance wire (having a composition of 73 percent Ni, 20 percent Cr, and 7 percent miscellaneous metals such as Al and Fe) onto a solid ceramic body to achieve a resistance of 503 ohms. For the 20 resistors made, the resistance ranged from 502 to 505 ohms with a $\pm 20$ ppm/degrees C. temperature coefficient. Copperweld leads having steel wires with a 40 percent conductive copper plating were secured to each end of the ceramic body to provide a means of external connection to the resistance wire.

In summary, the ion energy filter is composed of a stack of 20 thin metal plates, each insulated from the others and each having a centrally located hole with a unique radius. The plate closest to the plane of the origin of the hemispherical field provided by metallic hemisphere 230 on the base plate 400 has the hole with smallest radius. The radii of the holes in the subsequent plates increase with increasing distance from the origin. The relative potential of each plate is determined by a chain of 20 resistors, with each junction connected to a plate. When a direct current is passed through the resistor chain, potentials are developed at each junction, and therefore on each plate.

For simplicity of design, all the plates and insulating spacers have the same thickness, and all the resistors have the same value, resulting in equal potential steps along the series string of resistors. The radii of the holes in the plates were chosen to position these potential steps so as to satisfy the relationship $V\alpha(1/r)$ where V is the voltage on the plate and r is the radius of the hole. Each plate has a tab which extends beyond the outside diameter of the generally circular plate and is positioned such that when the plates are assembled to form a stack, the tabs occur at equal intervals on the circumference of the stack. This permits the resistor leads to be fastened from tab to tab, greatly simplifying the wiring. Only two wires (the ends of the resistor chain) are required to power the filter.

The two diametrically opposed apertures (formed by holes 501 and 502 in each of the plates) are positioned in the stack of plates and in the base plate below them (by holes 401 and 402) to permit the entrance and exit of secondary ions. One of the apertures serves as an entrance aperture and the other serves as an exit aperture. In addition to providing access to the filter, these apertures act as lenses. When filtering positive ions for SIMS, the center hemisphere 230 is biased at the filters maximum negative potential. Because hemisphere 230 is mounted directly on base plate 400, and the material sample being analyzed is positioned just beneath the entrance aperture in this plate, the positive ions leaving the sample are accelerated into the entrance aperture of the base plate. This increases the secondary ion collection efficiency of the filter. As the ions continue on their paths to the interior of the filter, they must pass through the entrance aperture provided by the holes in the plates. Each plate that they pass is biased less negatively than the preceding plate. The ions, therefore, experience a deceleration. The effect of this deceleration is to launch the ions into the central force field of the filter at the energies required for near circular orbits.

As the selected ions approach the exit aperture of the plates, they are accelerated out of the filter by the increasingly negative potentials on the plates and the base plate. When the ions travel between the base plate and the quadrupole mass analyzer, they experience a deceleration because of the large negative potential on the base plate relative to the virtual ground of the quadrupole axis. This deceleration is necessary for proper mass analysis.

What has been described hereinabove is an illustrative embodiment of the present invention. Numerous departures may be made therefrom without departing from the spirit and scope of the present invention. For example, the resistors may be fabricated with unequal values and the radii of the central holes in the plates adjusted accordingly to continue to achieve a potential distribution which is proportional to the reciprocal of the radial distance from the center.

What is claimed is:

1. Apparatus for creating a hemispherically shaped electric field for filtering charged particles comprising a plurality of metal rings concentric along a center line, each ring having a different inner radius from the center line and being insulated from each other of said plurality of metal rings, and means for applying a potential of substantially $V\alpha(1/r)$ to each of said plurality of metal rings where r is said inner radius from the center line.

2. A charged particle energy filter comprising a circular conductive base plate having a center and two holes diametrically positioned a predetermined distance from said center, a conductive hemispherical structure centrally mounted on said base plate, and a plurality of circular conductive plates each one of which has a centrally positioned hole different in size from each other of said plurality of circular conductive plates, each of said plurality of circular conductive plates having centrally positioned hole whose radius is less than said predetermined distance, each of said circular conductive plates also having two holes diametrically positioned said predetermined distance from its center, said plurality of plates being assembled to said base plate to from a stack wherein each plate is electrically insulated from each of said circular conductive plates and each plate is positioned in the stack such that all plates further removed from said base plate have larger central holes, said two holes in said plurality of plates and in said base plate being coincident to form an entrance and exit aperture in said stack, and means for applying a different potential to each one of said plurality of plates.

3. A charged particle energy filter as defined in claim 2 wherein each one of said plurality of plates has a tab which protrudes from the stack at a different location around the circumference of said stack, and said means for applying a different potential includes a series string of resistors having the potential between adjacent resistors connected to a different one of the tabs protruding from said stack.

4. A charged particle energy filter as defined in claim 3 wherein each of the resistors in said series string of resistors has the same resistance and the radius for said centrally positioned hole in each of said plurality of plates is chosen such that the voltage present on each one of said plurality of plates is proportional to the reciprocal of the radial distance from said center.

* * * * *

UNITED STATES PATENT AND TRADEMARK OFFICE

CERTIFICATE OF CORRECTION

PATENT NO. : 4,742,224

DATED : May 3, 1988

INVENTOR(S) : Steven Chu, Aly Dayem, Eric H. Westerwick

It is certified that error appears in the above-identified patent and that said Letters Patent is hereby corrected as shown below:

Column 1, line 32, change "$E\alpha(1/r^2)$" to --$E\propto(1/r^2)$--.

Column 1, line 36, change "$V\alpha(1/r)$" to --$V\propto(1/r)$--.

Column 1, line 57, change "$V\alpha(1/r)$" to --$V\propto(1/r)$--.

Column 3, line 65, change "$V\alpha(1/r)$" to --$V\propto(1/r)$--.

Column 4, claim 1, line 55, change "$V\alpha(1/r)$" to --$V\propto(1/r)$--.

Signed and Sealed this

Fourteenth Day of March, 1989

*Attest:*

DONALD J. QUIGG

*Attesting Officer* *Commissioner of Patents and Trademarks*